United States Patent
Williamson et al.

(10) Patent No.: US 11,242,042 B2
(45) Date of Patent: Feb. 8, 2022

(54) BRAKING DEVICE

(71) Applicant: Westinghouse Air Brake Technologies Corporation, Wilmerding, PA (US)

(72) Inventors: David Lee Williamson, Greer, SC (US); Kenneth Paul Rivard, Simpsonville, SC (US); Zachary Paul Farque, Greenville, SC (US)

(73) Assignee: Westinghouse Air Brake Technologies Corporation, Wilmerding, PA (US)

(*) Notice: Subject to any disclaimer, the term of this patent is extended or adjusted under 35 U.S.C. 154(b) by 109 days.

(21) Appl. No.: 16/585,292

(22) Filed: Sep. 27, 2019

(65) Prior Publication Data

US 2020/0114890 A1    Apr. 16, 2020

Related U.S. Application Data

(60) Provisional application No. 62/743,573, filed on Oct. 10, 2018.

(51) Int. Cl.
| | |
|---|---|
| *F16D 65/14* | (2006.01) |
| *B60T 13/22* | (2006.01) |
| *B60W 10/184* | (2012.01) |
| *F16D 65/092* | (2006.01) |

(52) U.S. Cl.
CPC .......... *B60T 13/22* (2013.01); *B60W 10/184* (2013.01); *F16D 65/092* (2013.01); *B60T 2270/89* (2013.01)

(58) Field of Classification Search
CPC . B60T 8/44; B60T 8/50; B60T 8/5075; B60T 8/5081; B60T 8/5087; B60T 8/5093; B60T 13/10; B60T 2270/89; F16D 2127/02
See application file for complete search history.

(56) References Cited

U.S. PATENT DOCUMENTS

| | | | |
|---|---|---|---|
| 2,279,407 A | 4/1942 | McCune | |
| 2008/0091326 A1* | 4/2008 | Watanabe | B60T 13/741 701/70 |
| 2013/0261890 A1* | 10/2013 | Roberts | F16D 65/568 701/36 |

* cited by examiner

*Primary Examiner* — Nicholas J Lane
(74) *Attorney, Agent, or Firm* — The Small Patent Law Group LLC; Christopher R. Carroll

(57) ABSTRACT

A control system and method control release of a braking device from a wheel or disc. Release of the braking device is slowed or stopped based on a speed at which the braking device is released. The braking device may include a return limiting device through which a rod is configured to move. The return limiting device permits the rod to slide within the return limiting device while the brake pad holder releases from the wheel or disc no faster than a designated speed, but engages and restricts movement of the rod within the return limiting device while the brake pad holder releases from the wheel or disc faster than the designated speed.

18 Claims, 10 Drawing Sheets

BRAKING DEVICE

CROSS-REFERENCE TO RELATED APPLICATIONS

This application claims priority to U.S. Provisional Application No. 62/743,573, which was filed on 10 Oct. 2018, and the entire disclosure of which is incorporated herein by reference.

BACKGROUND

Technical Field

The present disclosure is generally directed to a brake device for a vehicle.

Discussion of Art

Vehicles may have brake devices to slow or stop movement of the vehicles. Some types of brake devices may have brake calipers that control application of friction to slow or stop movement of the vehicles. For example, a disc brake caliper for a railway vehicle typically includes a brake actuator, levers for transmitting a brake force from the actuator to the lever, brake pad holders arranged at the lever ends, and a connection arrangement for assembling each of these components to form the brake caliper. The brake pad holders are provided with replaceable brake pads having a friction material for applying the braking force to a brake disc on which the disc brake caliper is mounted. A pressurized fluid is typically supplied to the brake actuator to force the levers to move into contact with the brake disc to create a frictional force against the brake disc using the brake pads to reduce the speed of the railway vehicle.

After a pressurized fluid has stopped being supplied to the brake actuator, a return spring provided between the levers is configured to push the levers outwardly to force the brake pads to disengage from the brake disc. Often during this operation of the brake caliper the return spring will push the levers too forcefully and outwardly cause damage to the levers and possibly the brake pads. Since the pressurized fluid no longer assists in reducing the amount of force that the return spring applies to the levers, the return spring may overexert the force that is applied to the levers, thereby causing the levers to move outwardly too quickly.

BRIEF DESCRIPTION

In one embodiment, a control system includes a controller configured to control release of a braking device from a wheel or disc. The controller is configured to slow or stop release of the braking device based on a speed at which the braking device is released.

In one embodiment, a method for controlling a braking device includes monitoring a speed of release of the braking device from a wheel or disc and slowing or stopping the release of the braking device based on the speed at which the braking device is released.

In one embodiment, a braking device includes a rod coupled with a brake pad holder. The rod and the brake pad holder are configured to move toward a wheel or disc to apply a braking effort to the wheel or disc. The rod and brake pad holder are configured to move away from the wheel or disc to release the braking effort from the wheel or disc. The braking device also includes a return limiting device through which the rod is configured to move. The return limiting device is configured to permit the rod to slide within the return limiting device while the brake pad holder releases from the wheel or disc no faster than a designated speed. The return limiting device is configured to engage and restrict movement of the rod within the return limiting device while the brake pad holder releases from the wheel or disc faster than the designated speed.

BRIEF DESCRIPTION OF THE DRAWINGS

The inventive subject matter may be understood from reading the following description of non-limiting embodiments, with reference to the attached drawings, wherein below.

DETAILED DESCRIPTION

The inventive subject matter describes herein to braking devices, such as brake calipers having a return limiting device that controls or limits the force applied to brake pads and/or components connected to the pads (e.g., levers) after disengaging or releasing the braking devices. For example, the return limiting device can reduce the force applied by a return spring after pressurized fluid is no longer supplied to a brake actuator of the brake caliper.

The brake devices described herein can be used in a variety of vehicles, such as rail vehicles, automobiles, agricultural vehicles, mining vehicles, or other off-highway vehicles.

Figure 1:
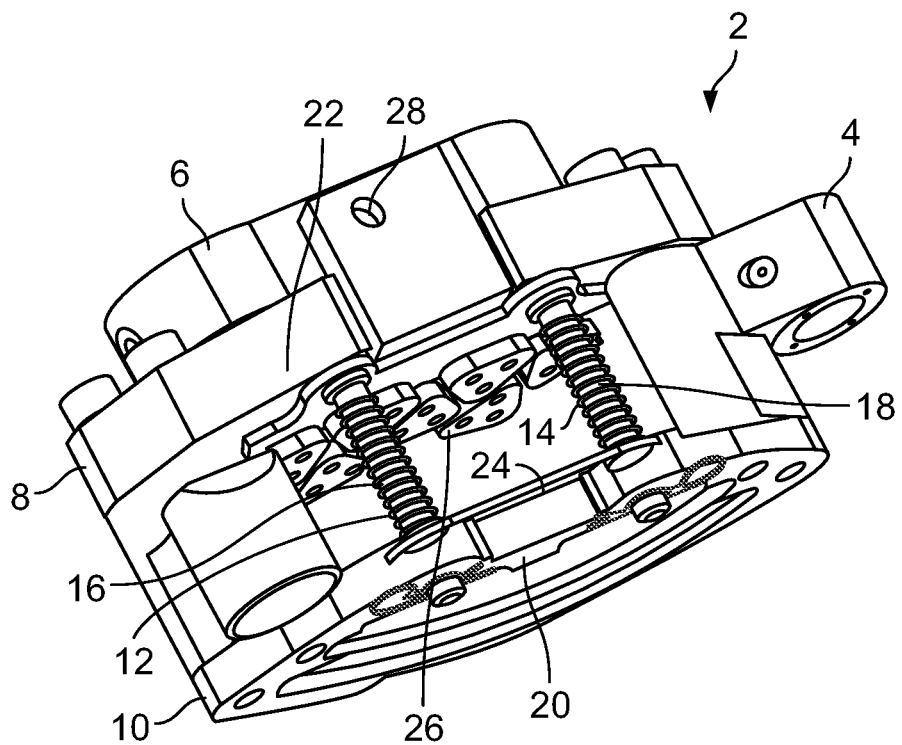
FIG. 1 is a perspective view of one embodiment of a braking device.
Figure 2:
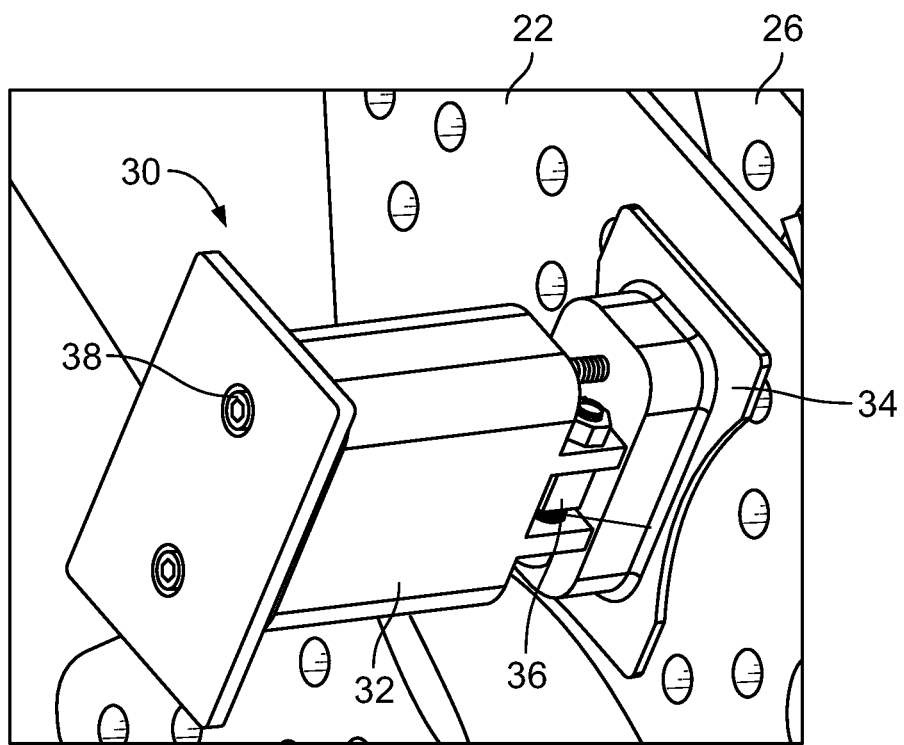
FIGS. 2 through 11 illustrate a return limiting device of the braking device shown in FIG. 1.
Figure 3:
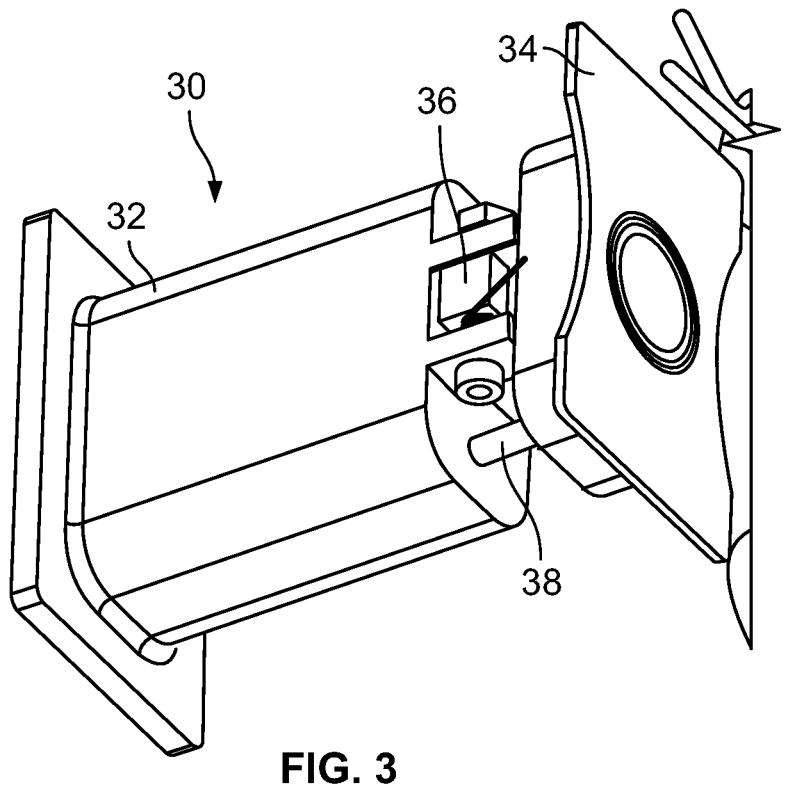
Figure 4:
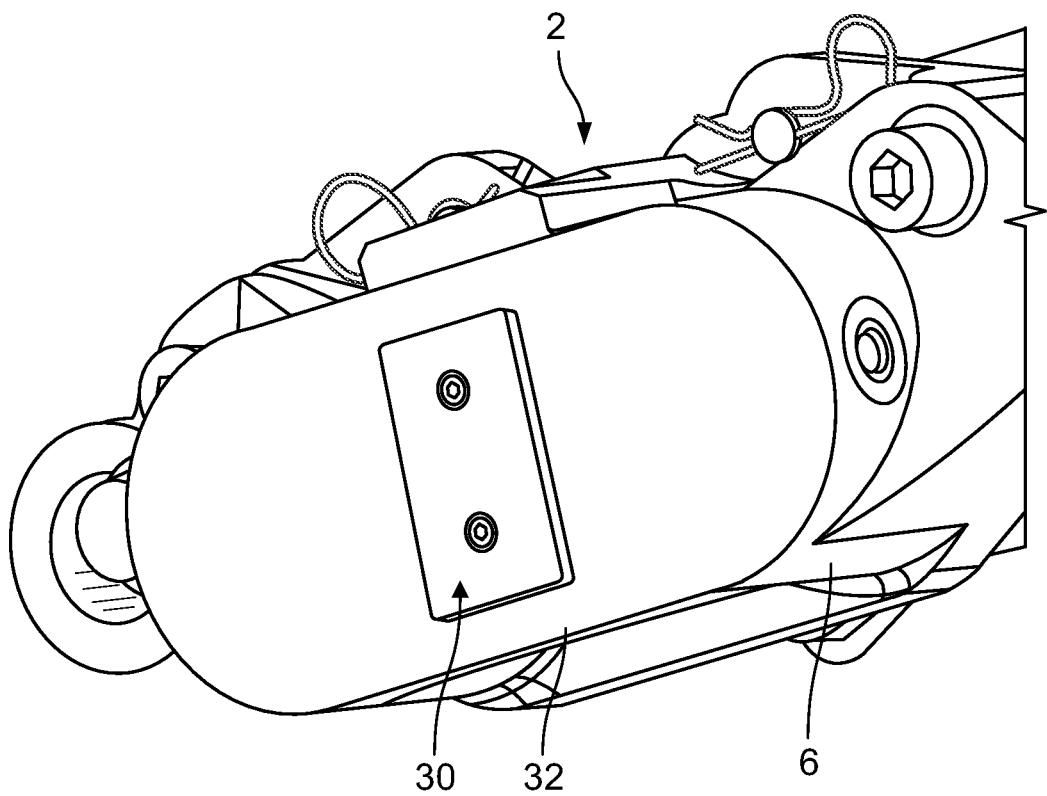
Figure 5:
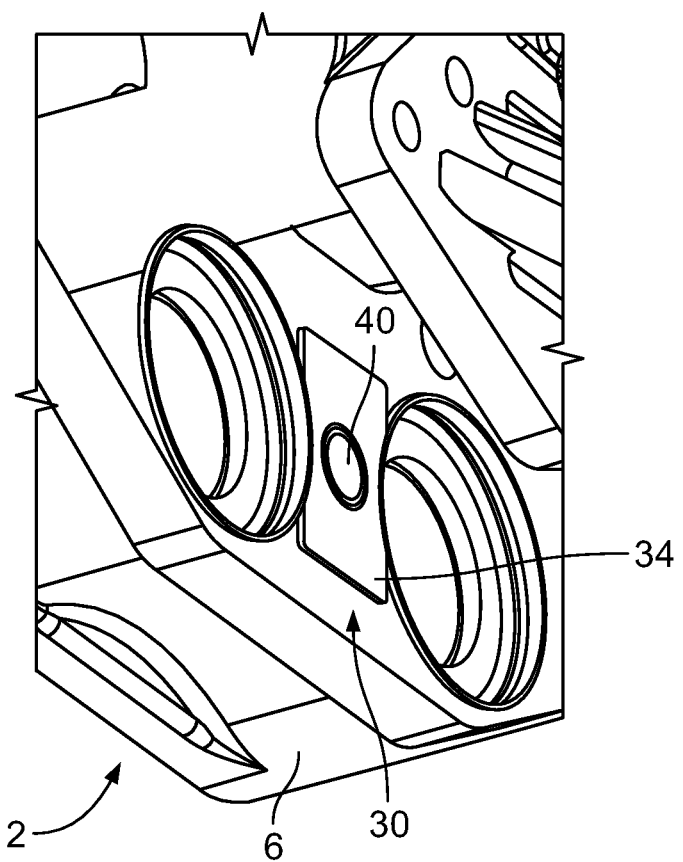

FIG. 1 is a perspective view of one embodiment of a braking device 2. The braking device 2 is a brake caliper that may be used in connection with friction brakes of a vehicle to slow or stop movement of the vehicle. The braking device includes a base member 4 connected with a brake actuator 6 by a first arm 8. A second arm 10 opposes the first arm 8 and also is connected with the first arm 8 by the base member 4. Elongated cross members 12, 14 extend from one of the arms 8 to the other arm 10. Resilient members 16, 18 are disposed between the arms 8, 10. For example, the resilient members 16, 18 can be springs with each spring disposed around a different arm 8 or 10.

Opposing brake pad holders 20, 22 are received on the cross members such that the brake pad holder 20 is between the resilient members 16, 18 and the arm 10 and the other brake pad holder 22 is between the resilient members 16, 18 and the arm 8. The brake pad holder 22 can slide along the lengths of the cross members to move toward or away from the opposing brake pad holder 20.

Brake pads 24, 26 are held on the brake pad holders 20, 22. A cavity is defined between the brake pads 24, 26 to receive a vehicle wheel or disc. The brake pads may include a friction material on an outer surface thereof to engage the wheel or disc to create a frictional force that reduces the rotational speed of the wheel. The brake actuator includes a fluid port 28. This port receives pressurized fluid into the brake actuator. This pressurized fluid pushes the brake pad holder 22 toward the opposing brake pad holder 20. This engages the braking device and applies force to the brake pads onto the wheel (to slow or stop movement of the wheel).

FIGS. 2 through 11 illustrate different views of one embodiment of a return limiting device 30. The return limiting device 30 includes an elongated body 32 joined with a head 34 and a return restriction member 36 located between the body and the head. As shown in FIGS. 4 through 7, the return limiting device may be received within the brake actuator of the brake caliper 2. The head is connected to the body via one or more fasteners 38, such as bolts, screws, or the like. An adjustable gap is defined between the head and the body. The gap is adjustable via rotation of the fasteners to bring the head closer to or farther from the body. Adjusting the size of this gap can allow for the return limiting device to be received in a variety of different types or models of brake actuators or braking devices. This can permit the return liming device to be retrofitted into pre-existing or used braking devices.

Figure 6:
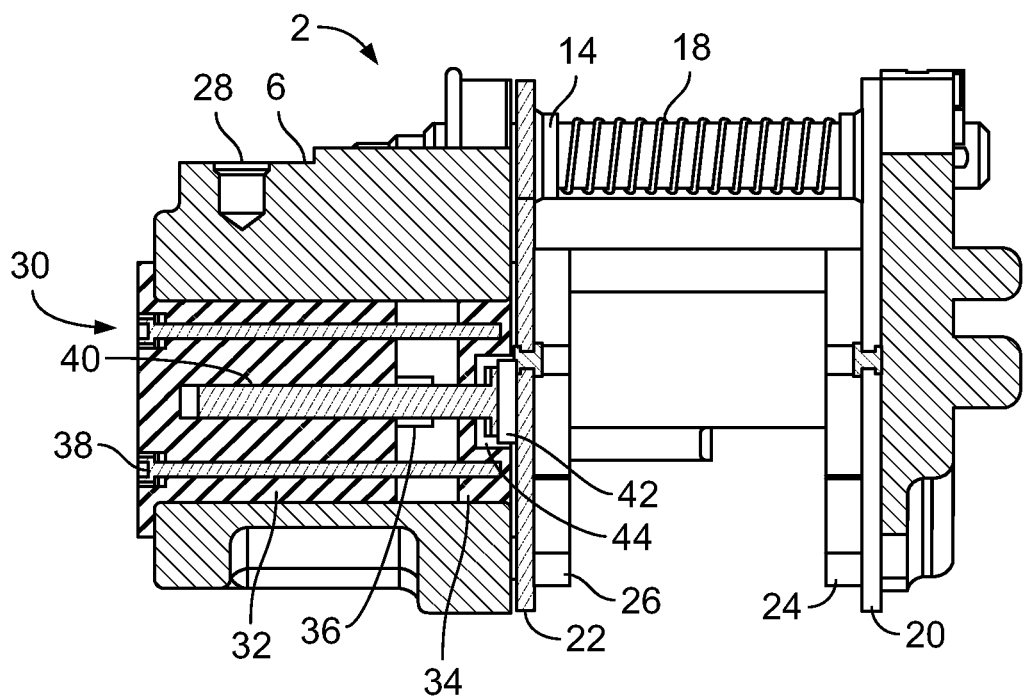
Figure 7:
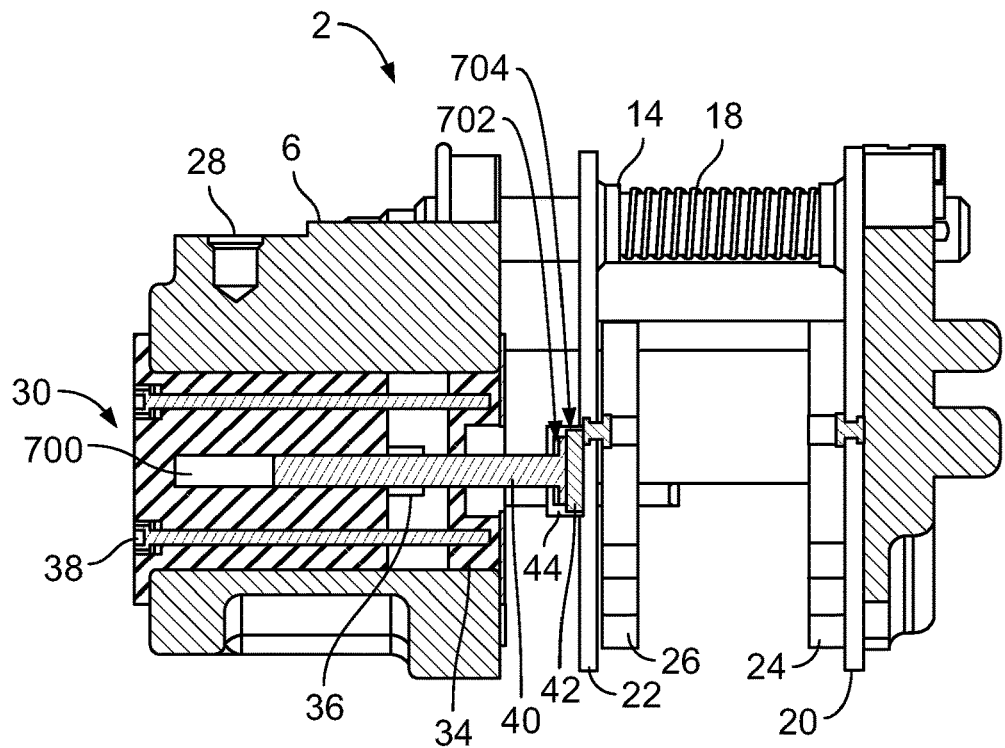

An elongated rod 40 is slidably received in a cavity 700 defined by the body (shown in FIG. 7). A head 702 of the rod (shown in FIG. 7) is received in a cavity 704 (shown in FIG. 7) defined in the head of the return limiting device. In one embodiment, a magnet 42 is magnetically attached to the head of the rod 40. As shown in FIGS. 6 and 7, the magnet 42 is also configured to be magnetically attached to the brake pad holder 22 during activation of the brake pad holder 22. The head of the rod 40 and the magnet 42 are received in a cap 44 that is slidably received in the cavity defined in the head 34.

The rod 40 also extends between the gap defined by the body 32 and the head 34 of the return limiting device 30 so as to extend through an aperture or channel 1104 (shown in FIG. 11) through the return restriction member 36. The return restriction member 36 is a body or block with the aperture 1104 sized large enough to permit the rod 40 to slide within the aperture 1104 relative to the return restriction member 36. In one embodiment, the return restriction member 36 defines the aperture 1104 that includes a close tolerance to the rod 40. Friction between the aperture and the rod 40 will tend to rotate the return restriction member 36. This relationship utilizes a binding ratio in a reverse movement. The return restriction member 36 utilizes this concept in reverse to ensure there is a binding due to geometry, pivot point, and degree at which the return restriction member 36 is permitted to rotate.

As shown in FIGS. 6 and 7, in operation, pressurized fluid is supplied to the fluid port 28 of the brake actuator 6. This fluid forces the brake pad holder 22 to move toward the opposing brake pad holder 20. As the brake pad holder 22 moves toward the brake pad holder 20, the brake pads 24, 26 press against a wheel or disc to create a frictional force to reduce the rotational speed of the wheel or disc. With the supply of pressurized fluid, the rod 40 of the return limiting device 30 also is moved in a direction toward the opposing brake pad holder 20 until the magnet 42 connects to the brake pad holder 22 (as shown in FIGS. 6 and 7).

Figure 8:
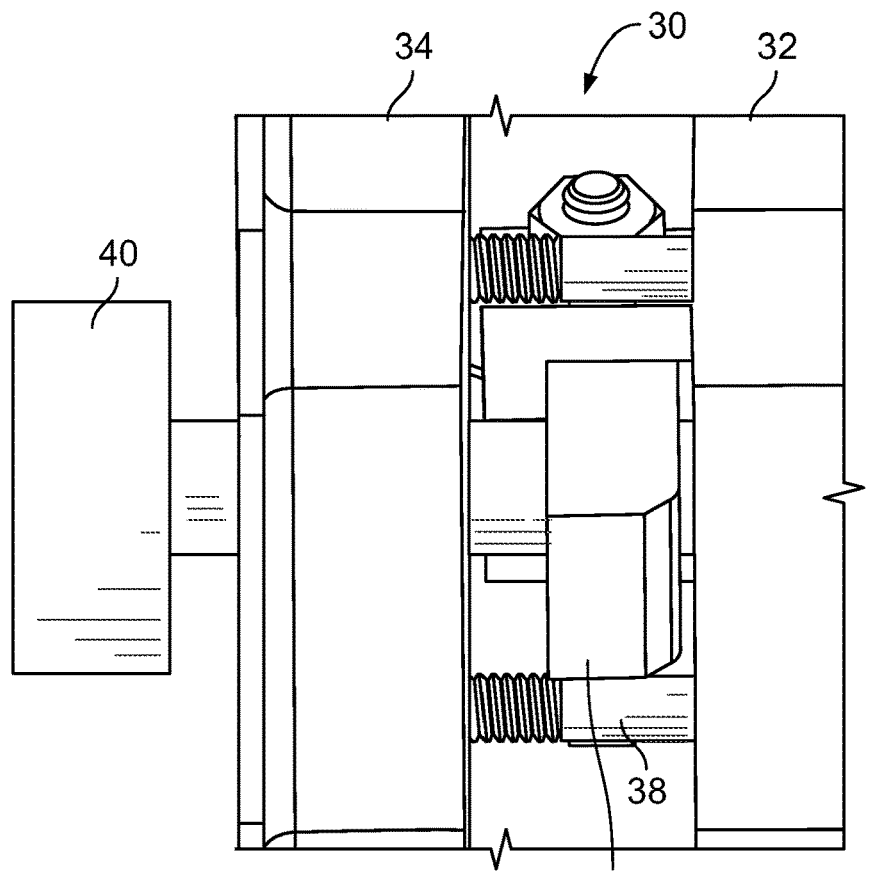

In this motion of direction, the return restriction member 36 permits the rod 40 to freely move to engage the magnet 42 and the brake pad holder 22, as shown in FIG. 8. The rod 40 can slide through the channel 1104 in the return restriction member 36. After the brake actuator 6 has supplied a sufficient volume of pressurized fluid against the brake pad holder 22 so as to create a sufficient braking force with the brake pads 24, 26, the pressurized fluid may no longer be supplied to the brake actuator 6.

Once pressurized fluid is no longer supplied, the resilient members 16, 18 push the brake pad holder 22 away from the wheel or disc to release the wheel or disc from the brake pads 24, 26. As the brake pad holder 22 moves back toward the brake actuator 6, the brake pad holder 22 pushes the cap 44 back into the cavity defined in the head 34 of the return limiting device 30. In this motion, the cap 44 is pushed into the cavity while the head of the rod 40 remains in a stationary position. After the cap 44 has been pushed into the cavity of the head 34 a sufficient distance, the brake pad holder 22 begins to push the magnet 42 and the head of the rod 40 into the cap 44 and cavity of the head 34 as well.

Once the rod 40 has been pushed back into the cavity 700 of the head 34 (e.g., by the resilient members 16, 18), the rod 40 may cause the return restriction member 36 to rotate relative to the rod 40 so as to prevent further movement of the rod 40. For example, the return restriction member 36 may pivot in directions represented by arrows 1100, 1102 shown in FIG. 11. This pivoting can cause the rod 40 to engage or contact the inner surfaces of the return restriction member 36 in the channel 1104. This engagement can stop or slow movement of the rod 40 through the channel 1104 in the return restriction member 36 (e.g., slow or stop the movement relative to the rod 40 not engaging the return restriction member 36 in the channel 1104).

In the event the rod 40 is not moving above a certain speed, the return restriction member 36 will not rotate (or will rotate a lesser distance) and will allow the rod 40 to move therethrough. For example, the return restriction member 36 may not rotate or may rotate a smaller distance so that the rod 40 does not engage the inner surfaces of the return restriction member 36 in the channel 1104. This can allow the rod 40 to more freely move (e.g., slide) through the channel 1104 in the return restriction member 36. The rod 40 and the brake pad holder 22 are not moving so fast as to cause damage to the brake caliper 2 so the return restriction member 36 does not impede the motion of the rod 40.

Figure 9:
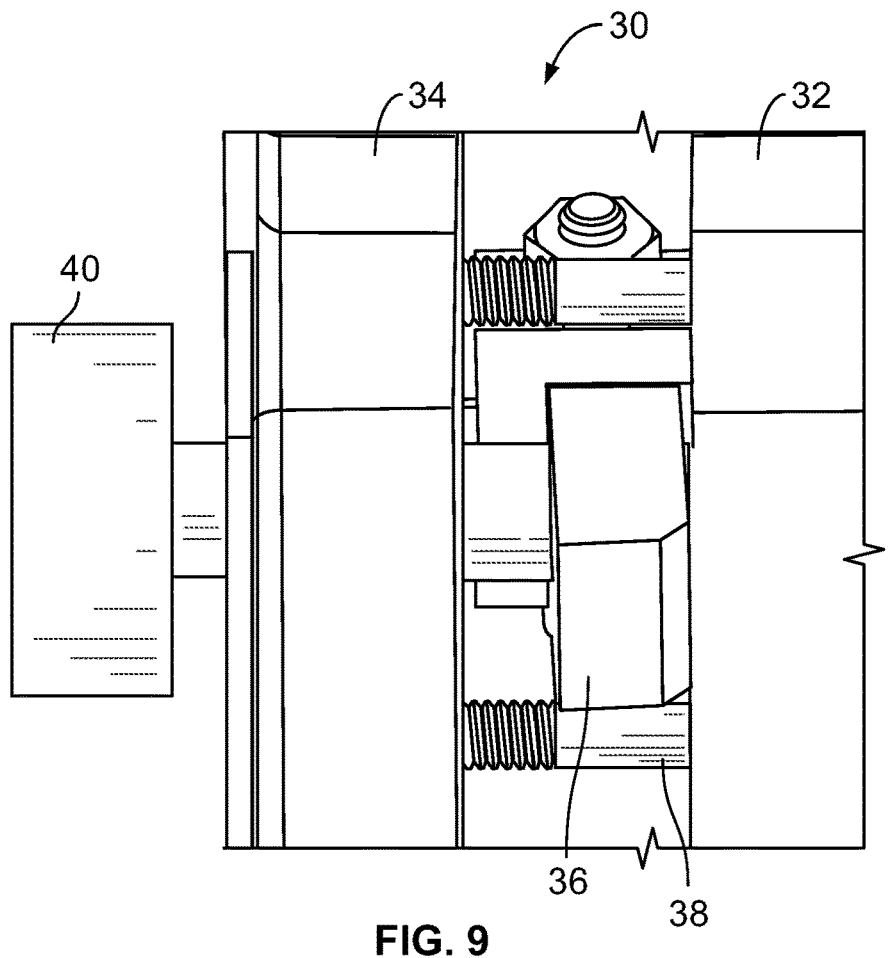
Figure 10:
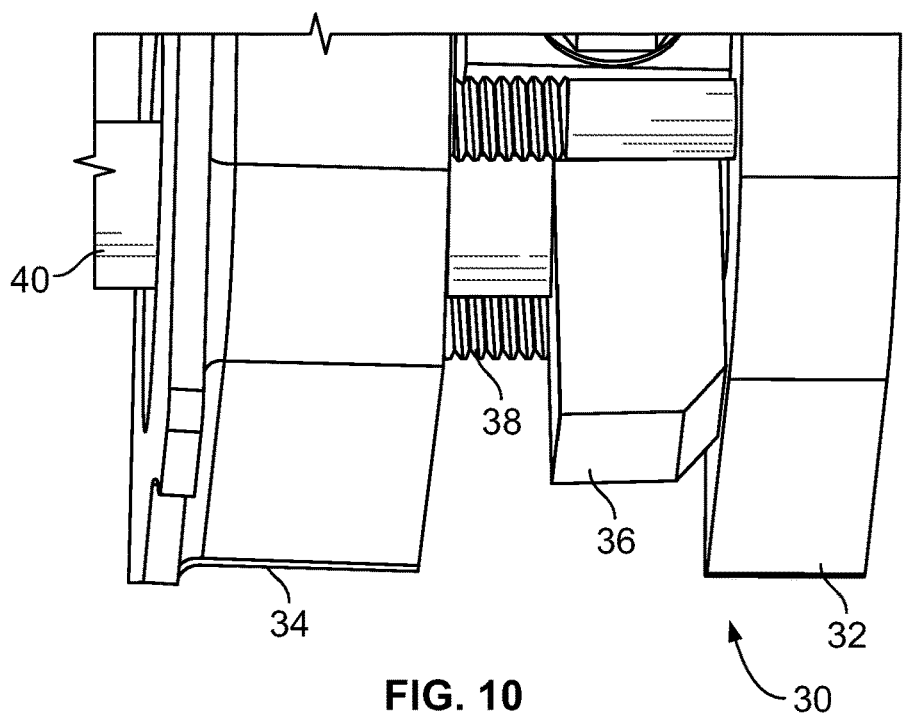
Figure 11:
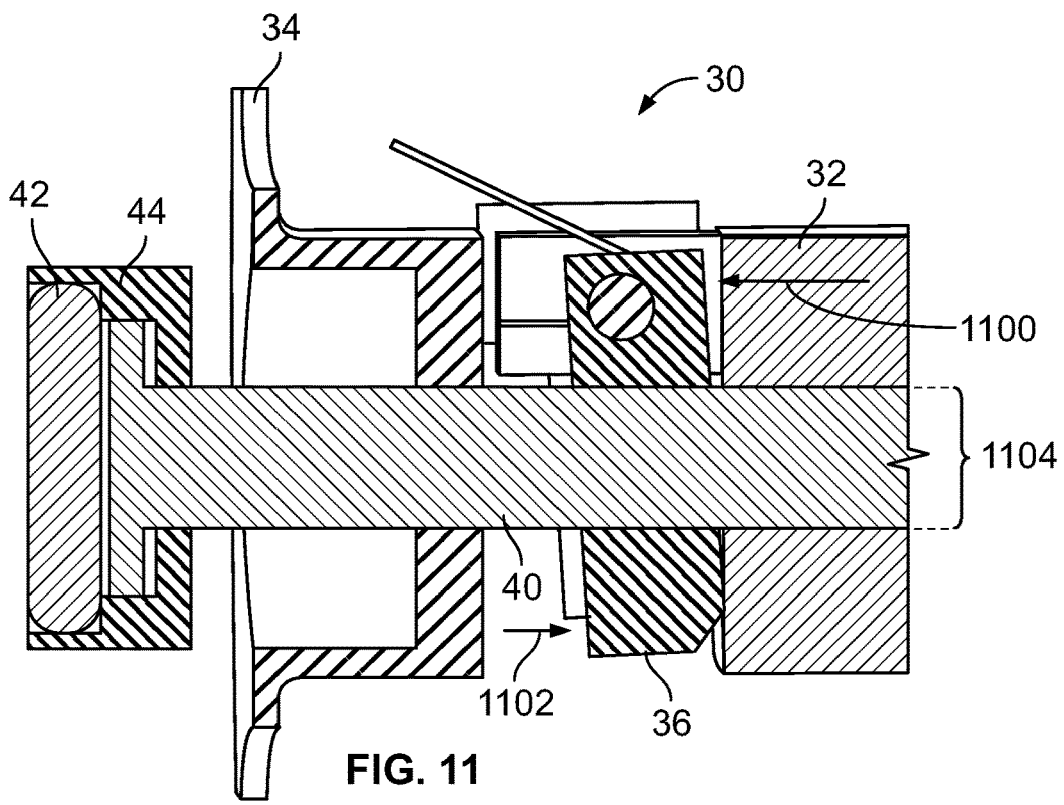
Figure 12:
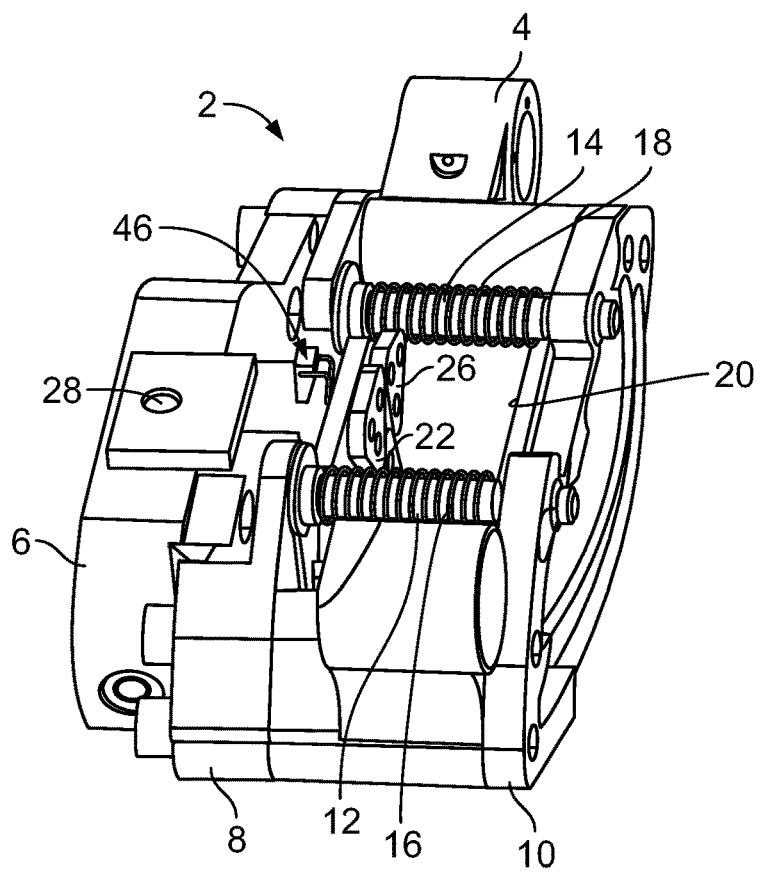
FIGS. 12 through 19 illustrate another example of a return limiting device.
Figure 13:
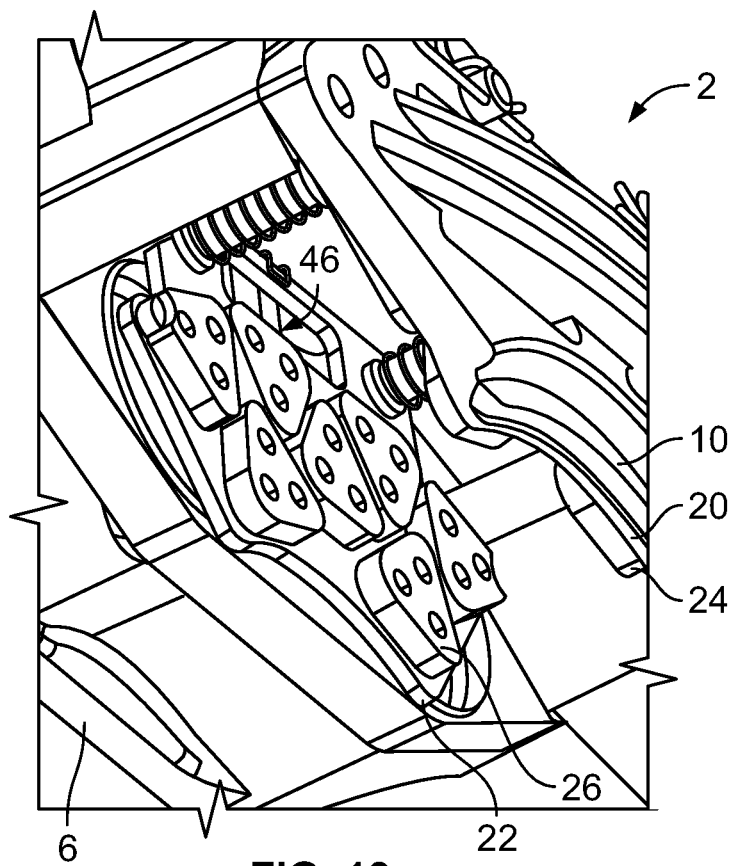
Figure 14:
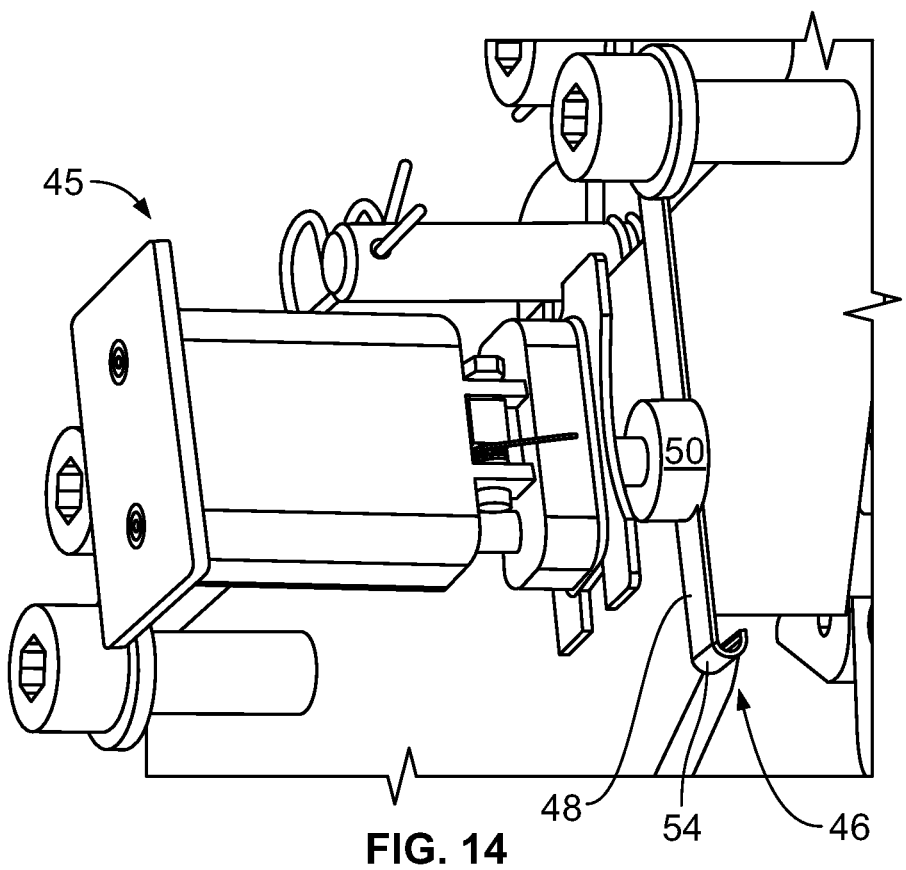
Figure 15:
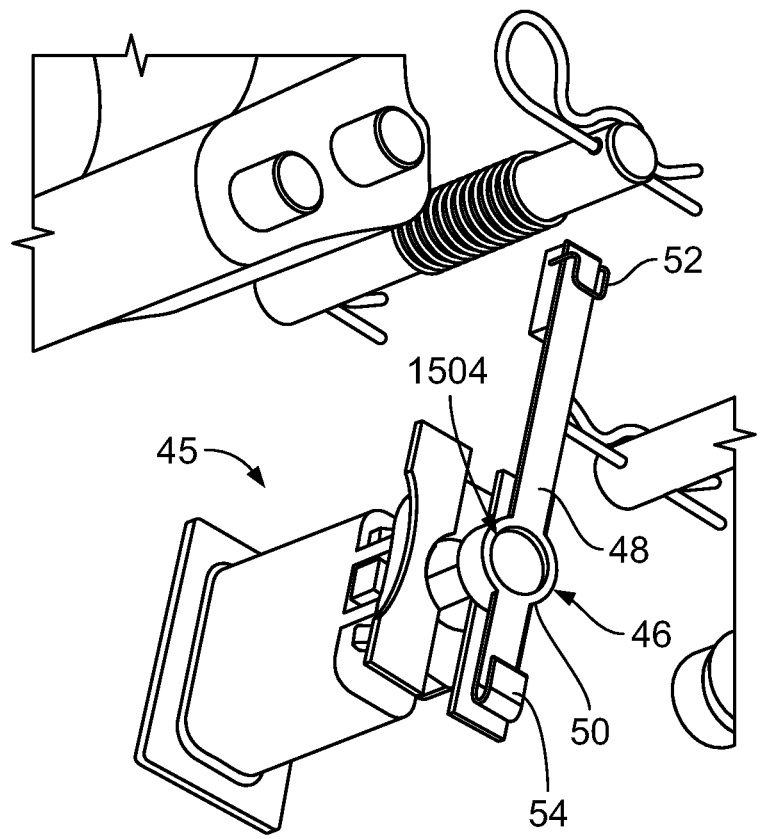

As shown in FIGS. 9 through 11, in the event the rod 40 is moving above a certain speed, the return restriction member 36 will rotate so as to engage the rod 40 to prevent the rod 40 from moving any further until the return speed of the rod 40 is reduced. In the event the rod 40 is moving above the certain speed, the rod 40 and the brake pad holder 22 are being returned too quickly to resting positions by the return resilient members 16, 18 so the return restriction member 36 slows the return speed of the rod 40 to slow the return speed of the brake pad holder 22 and prevent or lessen damage to the brake caliper 2.

FIGS. 12 through 19 illustrate another example of a return limiting device 45. The return limiting device 45 includes many of the same components of and operates similarly to the return limiting device 30 described above. There are a few differences between the two return limiting devices 30, 45, however, that are described below. Instead of the magnet 42 and the cap 44 that are used in the return limiting device 30 described above to connect the rod 40 to the brake pad holder 22, the return limiting device 45 includes a brake pad holder retaining member 46.

Figure 16:
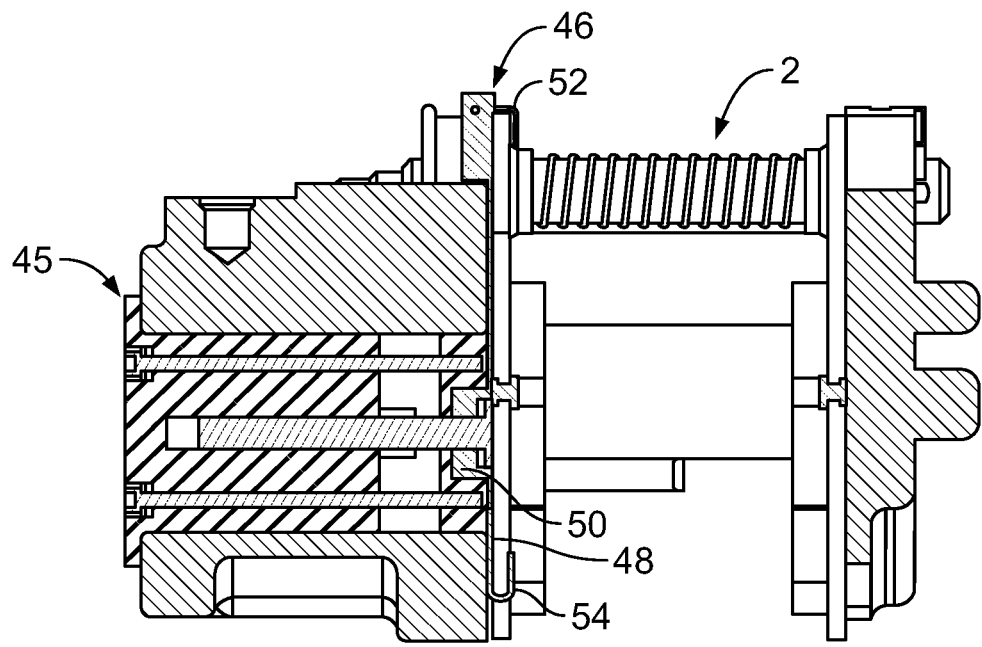
Figure 17:
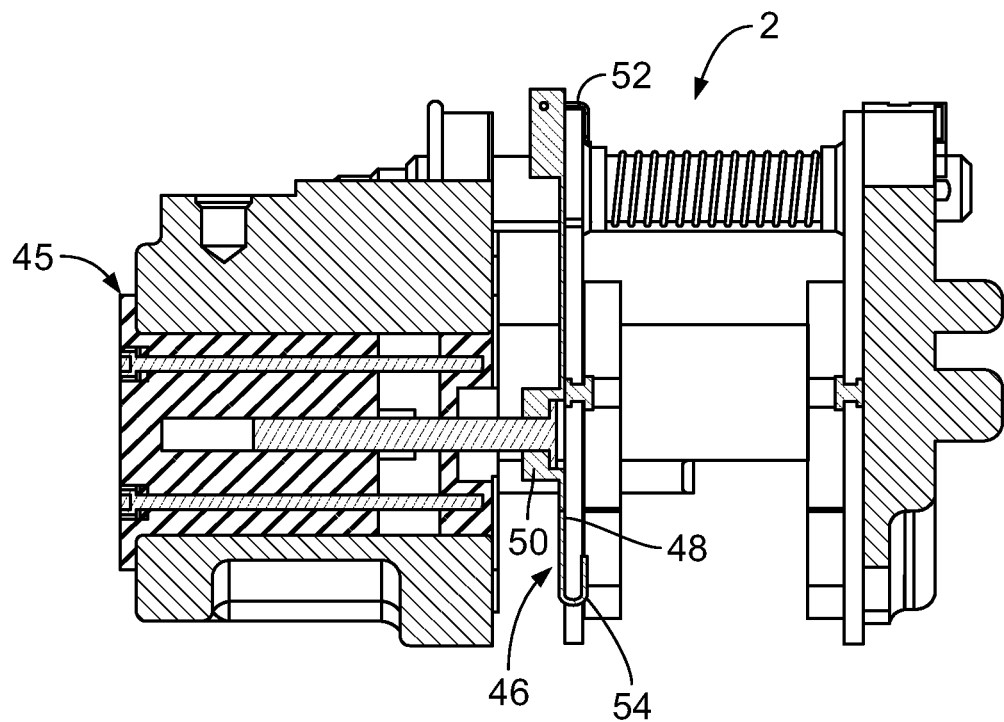

The brake pad holder retaining member 46 includes a body 48, a cap 50 formed integral with the body 48, and clip members 52, 54 provided on each end of the body 48. The brake pad holder retaining member 46 also includes an aperture or channel 1504 through the cap 50. As shown in FIGS. 16 and 17, the head of the rod is received within the cap 50 through the aperture 1504 and is configured to move therein during operation of the return limiting device 45. For example, the rod 40 can slide back and forth relative to the retaining member 46 through or within the aperture 1504.

The cap 50 operates with the rod and head of the return limiting device 45 similar to the cap 44 described above. Instead of using a magnet to connect the head and rod of the return limiting device 45 to the brake pad holder 22 of the brake caliper 2, the clip members 52, 54 are used to clip and secure the body 48 of the return limiting device 45 to the brake pad holder 22.

Figure 18:
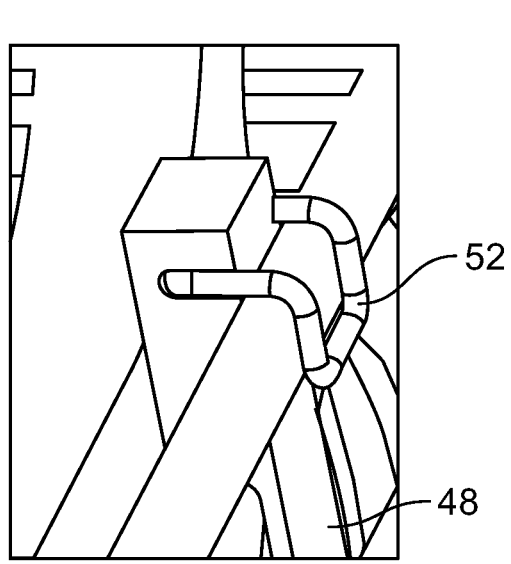
Figure 19:
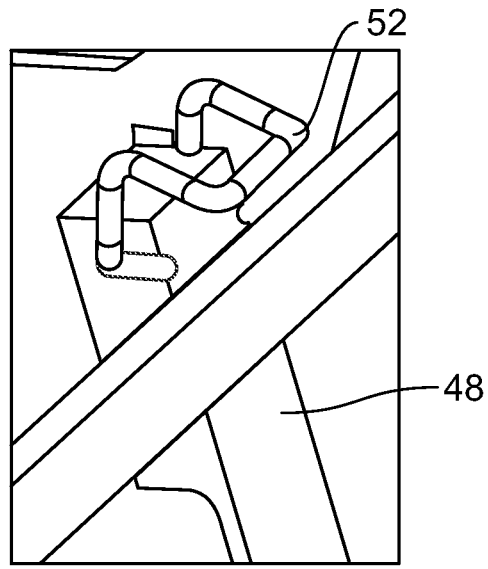

As shown in FIG. 16, the bottom clip member 54 is provided as an integral curved portion of the body 48 and holds a body edge of the brake pad holder 22. With reference to FIGS. 18 and 19, the upper clip member 52 is provided as a spring clip that can move between an activated position and a release position. The clip member 52 can be disengaged to move the clip member 52 between the activated position and the released position. When the clip member 52 is moved to the release position, the bottom edge of the brake pad holder 22 can be positioned in the bottom clip member 54 and then the brake pad holder 22 can be rotated towards the body 48 to rest against the body 48 of the brake pad holder retaining member 46. The upper clip member 52 can be rotated into the activated position to lock the upper edge of the brake pad holder 22 in the upper clip member 52. In this manner, the brake pad holder 22 can be held in the return limiting device 45 during operation of the brake caliper 2.

In operation, the return limiting device 45 can contact the inner surfaces of the retaining member 46 within the aperture 1504 when the brake pad holder 22 and rod move faster away from the wheel or disc during brake disengagement (than when the brake pad holder 22 and rod move slower away from the wheel or disc). As described above, this contact can slow or stop movement of the brake pad holder 22 to avoid damaging the brake caliper 2.

Figure 20:
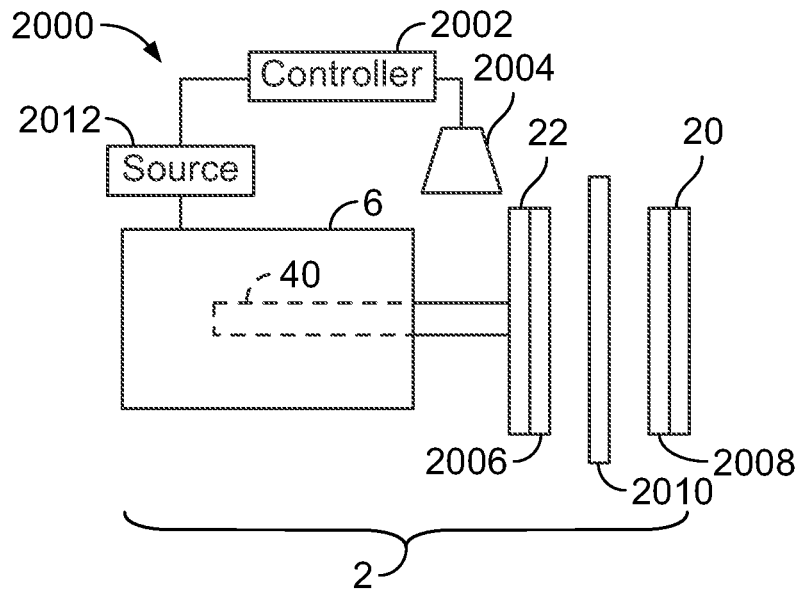
FIG. 20 illustrates one embodiment of a braking device control system.

FIG. 20 illustrates one embodiment of a braking device control system 2000. This control system may be used to control operation of the braking device 2 or another brake. The control system includes a controller 2002 that represents hardware circuitry that includes and/or is connected with one or more processors (e.g., one or more microprocessors, field programmable gate arrays, integrated circuits, microcontrollers, etc.) that perform operations described herein. The controller can monitor how rapidly the braking device is actuated or released, and control or restrict how quickly the braking device is released based on this information. For example, a speed sensor 2004 can monitor the position and/or speed at which the rod 40 and/or brake pad holder 22 (and/or brake pad 2006 joined with the holder 22) moves away from the opposing brake pad holder 24 (and/or brake pad 2008 joined with the holder 24).

The speed sensor can measure how rapidly the brake pad holder and/or brake pad moves, and optionally the direction in which the brake pad holder and/or brake pad moves (e.g., toward a wheel or disc 2010 or away from the wheel or disc). The speed sensor can include one or more magnetic field sensors, reed switches, Hall effect sensors, anisotropic magnetoresistive sensors, giant magnetoresistive sensors, or the like. The speed sensor can communicate the measured speed and/or direction of movement to the controller. The controller can determine whether the speed at which the braking device is disengaging or releasing from the wheel or disc poses a risk of damage to the braking device. For example, the controller can compare the speed at which the brake pad holder moves away from the wheel or disc with a threshold speed. If the braking device is disengaging at a speed that is faster than the threshold, then the controller can reduce the speed at which the brake pad holder moves away from the wheel or disc.

The controller can control the speed at which the braking device disengages from the wheel or disc by controlling a fluid source 2012 to reduce the rate at which fluid is drawn from the brake actuator 6. The fluid source can be a container or other reservoir of the fluid (e.g., braking fluid). The fluid source can include or be coupled with a pump that controls the rate at which the fluid is directed into and/or drawn out of the brake actuator. The controller can control the fluid source or pump to control how quickly or slowly the fluid is drawn out of or otherwise leaves the brake actuator. For example, responsive to detecting that the brake pad holder is moving too quickly away from the wheel or disc, the controller can slow the release of the braking device by slowing down how quickly the fluid leaves or is allowed to leave the actuator (e.g., by pumping additional brake fluid or air into the actuator). This can slow down movement of the brake actuator and protect the braking device from damage.

Figure 21:
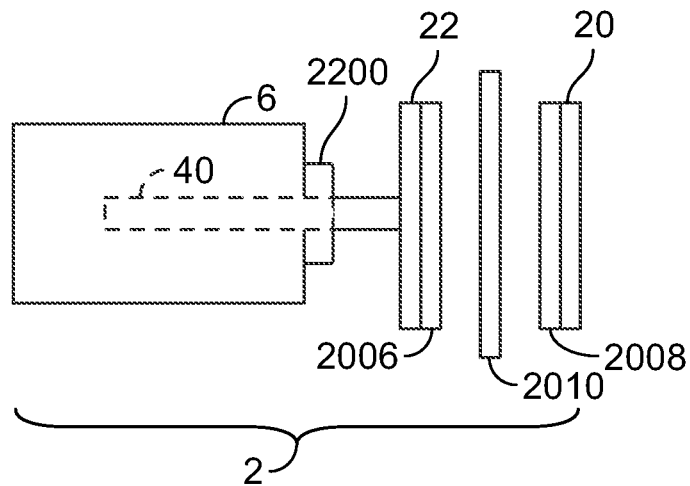
FIG. 21 illustrates another example of the braking device shown in FIG. 1.

FIG. 21 illustrates another example of the braking device 2. The braking device can be protected from damage caused by a brake pad holder 22 that is moving too quickly using a resilient pad or bushing 2200 as the return limiting device. The pad or bushing can be formed of a resilient material or may include springs. The pad or bushing is placed in a location between the brake pad holder 22 and the brake actuator 6. This resilient pad or bushing can absorb impact from the brake pad holder during a fast release of the braking device. Optionally, this resilient pad or bushing can slow the movement of the brake pad holder 22 toward the actuator.

Figure 22:
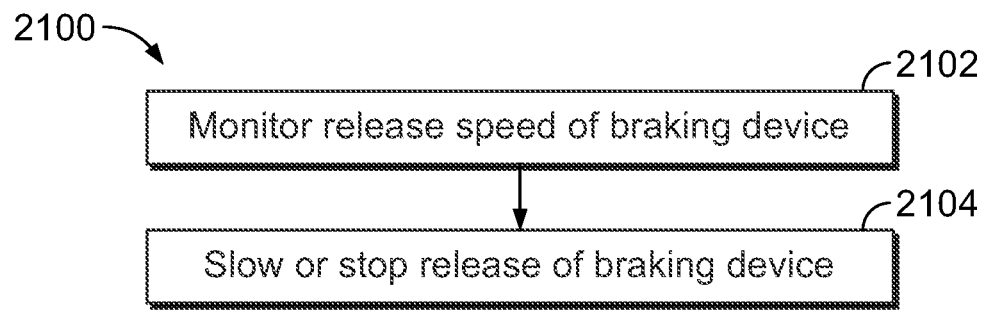
FIG. 22 illustrates a flowchart of one embodiment of a method for operating or controlling a braking device.

FIG. 22 illustrates a flowchart of one embodiment of a method 2100 for operating or controlling a braking device. The method 2100 can represent operations performed by or using the braking device or brake caliper 2 described herein. At 2102, a speed at which the braking device is being released is monitored. For example, the speed at which the brake pad holder 22 and/or rod 40 moves away from a wheel or disc is monitored. In one embodiment, the speed may be monitored by measuring the speed of the brake pad holder or rod using a speed sensor. Alternatively, the speed may be monitored by a return limiting device that pivots on the rod responsive to the speed at which the rod is moving through the return limiting device.

At 2104, responsive to the braking device being released too rapidly, the release of the braking device is slowed or stopped. In one example, a return limiting device can slow or stop movement of a brake pad holder that is moving too rapidly away from a wheel or disc. In another example, a controller can reduce or restrict the rate at which a fluid leaves a brake actuator. The speed of the releasing brake pad holder can be reduced to avoid damaging the braking device.

FIG. 23 illustrates a control system 2300 for several braking devices 2. The control system can represent hardware circuitry that includes and/or is connected with one or more processors. The control system communicates with several controllers (e.g., the controller 2002) that are disposed onboard different vehicles 2302 of a vehicle system 2304 formed from two or more of the vehicles. The vehicles may be automobiles, rail vehicles, agricultural vehicles, trucks, trailers, mining vehicles, or other off-highway vehicles. Alternatively, the vehicle system may be formed from a single vehicle. The controllers may each be associated with one or more (but not all) of several braking devices of the vehicle system (or a single vehicle). For example, a vehicle may have many braking devices with each braking device controlled by a different controller. The controllers can separately or individually control the braking applied by the different braking devices such that not all of the braking devices are engaged with different wheels or discs with the same effort or force. Some controllers can apply less force on a brake pad holder than other controllers such that different wheels or discs of the same vehicle or vehicle system (formed from two or more vehicles) experience different amounts of braking effort.

The control system can direct the amount of braking force that each braking device is to apply by directing the controllers to individually control how far each braking device is released. For example, instead of each or all braking devices alternating between a fully engaged state and a fully released state, the different braking devices can be engaged in intermediate states, such as 25% engaged, 50% engaged, 80% engaged, and so on. This can allow for different braking devices in different locations of a vehicle system to apply different amounts of braking effort or force to control forces within the vehicle system and/or to otherwise control movement of the vehicle system. The intermediate states of the braking devices can be controlled by controlling how far each braking device is released. For example, a braking device directed to be 90% engaged can have a brake pad holder 22 moved a first distance away from the wheel or disc, another braking device directed to be 50% engaged can have a brake pad holder 22 moved a farther, second distance away from the wheel or disc, another braking device directed to be 25% engaged can have a brake pad holder 22 moved a farther, third distance from the wheel or disc, and so on.

In one embodiment, a control system includes a controller configured to control release of a braking device from a wheel or disc. The controller is configured to slow or stop release of the braking device based on a speed at which the braking device is released.

Optionally, the braking device is one of several braking devices and the controller is one of several controllers each associated with a different braking device of the several braking devices. Each of the controllers may be configured to individually control the release of the corresponding braking device.

The controller may be configured to control an amount of braking effort provided by the braking device by controlling a distance that a brake pad holder of the braking device is moved from the wheel or disc. The braking device may be one of several braking devices and the controller is one of several controllers each associated with a different braking device of the several braking devices. Each of the controllers can be configured to individually control an amount of braking effort provided by the corresponding braking device by controlling a distance that a brake pad holder of the corresponding braking device is moved from a wheel or disc.

The controller can be configured to determine the speed at which the braking device is released by monitoring movement of a brake pad holder of the braking device. The controller may be configured to slow or stop release of the braking device by controlling flow of a fluid into or out of an actuator of the braking device.

In one embodiment, a method for controlling a braking device includes monitoring a speed of release of the braking device from a wheel or disc and slowing or stopping the release of the braking device based on the speed at which the braking device is released.

Optionally, the braking device is one of several braking devices. Slowing or stopping the release of the braking device can be individually controlled for each of the braking devices. The braking device can be slowed or stopped to control an amount of braking effort provided by the braking device. The amount of braking effort may be controlled by limiting a distance that a brake pad holder of the braking device is moved from the wheel or disc.

The braking device can be one of several braking devices, and the method also can include individually controlling an amount of braking effort provided by each of the braking devices by controlling a distance that a brake pad holder of the corresponding braking device is moved.

Optionally, the speed at which the braking device is released is monitored by monitoring movement of a brake pad holder of the braking device. The release of the braking device may be slowed or stopped by controlling flow of a fluid into or out of an actuator of the braking device.

In one embodiment, a braking device includes a rod coupled with a brake pad holder. The rod and the brake pad holder are configured to move toward a wheel or disc to apply a braking effort to the wheel or disc. The rod and brake pad holder are configured to move away from the wheel or disc to release the braking effort from the wheel or disc. The braking device also includes a return limiting device through which the rod is configured to move, the return limiting device configured to permit the rod to slide within the return limiting device while the brake pad holder releases from the wheel or disc no faster than a designated speed. The return limiting device is configured to engage and restrict movement of the rod within the return limiting device while the brake pad holder releases from the wheel or disc faster than the designated speed.

Optionally, the return limiting device is configured to pivot relative to the rod to engage and restrict movement of the rod within the return limiting device while the brake pad holder releases from the wheel or disc faster than the designated speed. The return limiting device may include an aperture through which the rod extends and slides. The rod can be magnetically coupled with the brake pad holder. The return limiting device may clip onto the brake pad holder.

The return limiting device may be disposed between a brake actuator and the brake pad holder. Optionally, the return limiting device includes a pad or bushing.

As used herein, the terms "processor" and "computer," and related terms, e.g., "processing device," "computing device," and "controller" may be not limited to just those integrated circuits referred to in the art as a computer, but refer to a microcontroller, a microcomputer, a programmable logic controller (PLC), field programmable gate array, and application specific integrated circuit, and other programmable circuits. Suitable memory may include, for example, a computer-readable medium. A computer-readable medium may be, for example, a random-access memory (RAM), a computer-readable non-volatile medium, such as a flash memory. The term "non-transitory computer-readable media" represents a tangible computer-based device implemented for short-term and long-term storage of information, such as, computer-readable instructions, data structures, program modules and sub-modules, or other data in any device. Therefore, the methods described herein may be encoded as executable instructions embodied in a tangible, non-transitory, computer-readable medium, including, without limitation, a storage device and/or a memory device. Such instructions, when executed by a processor, cause the processor to perform at least a portion of the methods described herein. As such, the term includes tangible, computer-readable media, including, without limitation, non-transitory computer storage devices, including without limitation, volatile and non-volatile media, and removable and non-removable media such as firmware, physical and virtual storage, CD-ROMS, DVDs, and other digital sources, such as a network or the Internet.

The singular forms "a", "an", and "the" include plural references unless the context clearly dictates otherwise. "Optional" or "optionally" means that the subsequently described event or circumstance may or may not occur, and that the description may include instances where the event occurs and instances where it does not. Approximating language, as used herein throughout the specification and claims, may be applied to modify any quantitative representation that could permissibly vary without resulting in a change in the basic function to which it may be related. Accordingly, a value modified by a term or terms, such as "about," "substantially," and "approximately," may be not to be limited to the precise value specified. In at least some instances, the approximating language may correspond to the precision of an instrument for measuring the value. Here and throughout the specification and claims, range limitations may be combined and/or interchanged, such ranges may be identified and include all the sub-ranges contained therein unless context or language indicates otherwise.

This written description uses examples to disclose the embodiments, including the best mode, and to enable a person of ordinary skill in the art to practice the embodiments, including making and using any devices or systems and performing any incorporated methods. The claims define the patentable scope of the disclosure, and include other examples that occur to those of ordinary skill in the art. Such other examples are intended to be within the scope of the claims if they have structural elements that do not differ from the literal language of the claims, or if they include equivalent structural elements with insubstantial differences from the literal language of the claims.

What is claimed is:

1. A system comprising:
a controller configured to control release of a braking device from a wheel or disc, the controller configured to determine a speed at which the braking device is released by monitoring movement of a brake pad holder of the braking device, the controller configured to slow or stop release of the braking device based on the speed at which the braking device is released.

2. The system of claim 1, wherein the braking device is one of several braking devices and the controller is one of several controllers each associated with a different braking device of the several braking devices, each of the controllers configured to individually control the release of the corresponding braking device.

3. The system of claim 1, wherein the controller is configured to control an amount of braking effort provided by the braking device by controlling a distance that a brake pad holder of the braking device is moved from the wheel or disc.

4. The system of claim 1, wherein the braking device is one of several braking devices and the controller is one of several controllers each associated with a different braking device of the several braking devices, each of the controllers configured to individually control an amount of braking effort provided by the corresponding braking device by controlling a distance that a brake pad holder of the corresponding braking device is moved from a wheel or disc.

5. The system of claim 1, wherein the controller is configured to slow or stop release of the braking device by controlling flow of a fluid into or out of an actuator of the braking device.

6. A method comprising:
monitoring a speed of release of a braking device from a wheel or disc by monitoring movement of a brake pad holder of the braking device; and
slowing or stopping the release of the braking device based on the speed at which the braking device is released.

7. The method of claim 6, wherein the braking device is one of several braking devices, wherein slowing or stopping the release of the braking device is individually controlled for each of the braking devices.

8. The method of claim 6, wherein the release of the braking device is slowed or stopped to control an amount of braking effort provided by the braking device.

9. The method of claim 8, wherein the amount of braking effort is controlled by limiting a distance that a brake pad holder of the braking device is moved from the wheel or disc.

10. The method of claim 6, wherein the braking device is one of several braking devices, and further comprising:
individually controlling an amount of braking effort provided by each of the braking devices by controlling a distance that a brake pad holder of the corresponding braking device is moved.

11. The method of claim 6, wherein the release of the braking device is slowed or stopped by controlling flow of a fluid into or out of an actuator of the braking device.

12. A system comprising:
a braking device that includes a rod coupled with a brake pad holder, the rod and the brake pad holder configured to move toward a wheel or disc to apply a braking effort to the wheel or disc, the rod and brake pad holder configured to move away from the wheel or disc to release the braking effort from the wheel or disc, the braking device also including a return limiting device through which the rod is configured to move, the return limiting device configured to permit the rod to slide within the return limiting device while the brake pad holder releases from the wheel or disc no faster than a designated speed, the return limiting device configured to engage and restrict movement of the rod within the return limiting device while the brake pad holder releases from the wheel or disc faster than the designated speed; and
a controller configured to control release of the braking device from the wheel or disc, the controller configured to slow or stop release of the braking device based on a speed at which the braking device is released.

13. The system of claim 12, wherein the return limiting device is configured to pivot relative to the rod to engage and restrict movement of the rod within the return limiting device while the brake pad holder releases from the wheel or disc faster than the designated speed.

14. The system of claim 12, wherein the return limiting device includes an aperture through which the rod extends and slides.

15. The system of claim 12, wherein the rod is magnetically coupled with the brake pad holder.

16. The system of claim 12, wherein the return limiting device clips onto the brake pad holder.

17. The system of claim 12, wherein the return limiting device is disposed between a brake actuator and the brake pad holder.

18. The system of claim 17, wherein the return limiting device includes a pad or bushing.

* * * * *